United States Patent [19]
Hiji et al.

[11] Patent Number: 5,953,089
[45] Date of Patent: Sep. 14, 1999

[54] REFLECTIVE LIQUID CRYSTAL DISPLAY

[75] Inventors: Naoki Hiji; Shinya Kyozuka; Shigeru Yamamoto, all of Ebina, Japan

[73] Assignee: Fuji Xerox Co., Ltd., Tokyo, Japan

[21] Appl. No.: 08/714,292

[22] Filed: Sep. 18, 1996

Related U.S. Application Data

[63] Continuation of application No. 08/428,678, Apr. 25, 1995, abandoned.

[30] Foreign Application Priority Data

May 25, 1994 [JP] Japan ................................. 6-133877

[51] Int. Cl.$^6$ ..................... G02F 1/1333; G02F 1/1335
[52] U.S. Cl. ............................. 349/112; 349/113; 349/86
[58] Field of Search .................... 359/69, 52; 349/112, 349/113, 86, 99

[56] References Cited

U.S. PATENT DOCUMENTS

| | | | |
|---|---|---|---|
| 5,216,531 | 6/1993 | Hirai et al. | 359/52 |
| 5,386,306 | 1/1995 | Gunjima et al. | 359/52 |
| 5,437,811 | 8/1995 | Doane et al. | 359/51 |
| 5,548,425 | 8/1996 | Adachi et al. | 349/112 |
| 5,724,111 | 3/1998 | Mizobata et al. | 349/112 |
| 5,731,858 | 3/1998 | Hisatake et al. | 349/112 |
| 5,796,455 | 8/1998 | Mizobata et al. | 349/113 |

FOREIGN PATENT DOCUMENTS

| | | |
|---|---|---|
| B2-57-42867 | 9/1982 | Japan . |
| B2-57-43905 | 9/1982 | Japan . |
| B2-61-8430 | 3/1986 | Japan . |

OTHER PUBLICATIONS

*Journal of Applied Physics*, vol. 45, No. 11, Nov. 1974, Donald L. White et al., "New absorptive mode reflective liquid–crystal display device." pp. 4718–4723.

*Primary Examiner*—William L. Sikes
*Assistant Examiner*—Toan Ton
*Attorney, Agent, or Firm*—Oliff & Berridge, PLC

[57] ABSTRACT

A reflective liquid crystal display is disclosed, comprising:

a first substrate having a transparent electrode;

a second substrate having a specular, light-reflecting electrode provided so that its electrode surface faces an electrode surface of the first substrate;

a liquid crystal layer having dichroic dye and sandwiched by the first substrate and the second substrate; and a light-diffusing layer provided between the first substrate and the liquid crystal layer, and the light-diffusing layer comprising liquid crystalline polymer having directors of random orientation which varies spatially continuously.

14 Claims, 4 Drawing Sheets

REFLECTIVE LIQUID CRYSTAL DISPLAY

This is a continuation of application Ser. No. 08/428,678 filed Apr. 25, 1995, now abandoned.

FIELD OF THE INVENTION

The present invention relates to a reflective liquid crystal display which carries out displaying, using reflection of outside light. Reflective liquid crystal displays can be operated with low power consumption since they do not need backlights, and they are widely used as displaying devices of portable information devices and others, for example, notebook type personal computers or electronic pocketbooks. The present invention particularly relates to a reflective liquid crystal display capable of displaying images of high brightness, without using polarizers.

BACKGROUND OF THE INVENTION

Conventionally, Twisted Nematic Method (Hereinafter referred to as TN method) or Super Twisted Nematic Method (Hereinafter referred to as STN method) are generally known as the methods used for reflective liquid crystal displays. A reflective liquid crystal display of any of these methods comprises a liquid crystal cell made by sandwiching a liquid crystal layer by two substrates having transparent electrodes, two polarizers sandwiching the liquid crystal cell and a reflective plate provided on one of the polarizers. With this structure, there are problems such as low brightness and poor visibility of displayed images, which are caused by the light-absorbing characteristics of the two polarizers.

On the other hand, with a guest-host method (Hereinafter referred to as GH method) wherein dichroic dye (guest) is added to liquid crystal (host) and displaying is carried out using the absorption anisotropy is known as a method capable of displaying images of high brightness and good visibility, since polarizers are not necessary with this method.

For example, PCGH (Phase Change Guest Host) method using host of cholesteric liquid crystal as proposed in D. L. White and G. N. Taylor: J. Appl. Phys. 45,4718 (1974) is proposed.

The above described reflective liquid crystal display comprises at least a liquid crystal cell made by sandwiching a liquid crystal layer by two substrates having electrodes and a reflective plate, and to prevent parallax between displayed image on the liquid crystal layer and its shadow on the reflector, a structure comprising a reflective electrode for which the electrode of one of the two substrates doubles as a reflective plate is preferably used.

A reflective electrode is made of a film such as a metal deposited film, and as surrounding objects are reflected in displayed images and the visibility is considerably reduced if the electrode surface is specular, light-diffusing characteristics is provided to the electrode by making the electrode surface convexo-concave by methods such as etching. However, when making electrode surfaces uneven, there are the following problems: deterioration of productivity and increase in producing cost caused by the increase in manhour for making electrode surfaces uneven; difference, electrode by electrode, of light-diffusing characteristics and deterioration of yield rate because of technical difficulty for making the concaveness and convexness of each electrode same; and problems such as deterioration of the contrast of displayed images because of non-uniformity, which is inevitably caused, of the thickness of a liquid crystal layer.

To solve such problems, a structure wherein a light-diffusing layer is formed on a substrate, which does not have a reflective electrode, of the two substrates is disclosed in Japanese examined patent publication Sho 61-8430. In this publication, as shown in FIG. 2, an upper substrate is made by forming transparent electrode 21 and alignment layer 41 on thin substrate 13, applying polarizer 70 to the surface of the opposite side of substrate 13, forming light-diffusing layer 30 on polarizer 70 and sticking light-diffusing layer 30 to substrate 11 (The adhesion layer is not shown in the figure), and a lower substrate is made by forming specular reflection electrode 24 and alignment layer 42 on substrate 12 in order, and the device is made by sandwiching liquid crystal layer 50 by the upper and the lower substrates. According to the present invention, as it is not necessary to make the surface of specular reflection electrode 24 uneven, the above described problems and non-uniformity of the liquid crystal layer do not occur.

However, to carry out displaying of high quality using the above described structure, it is necessary that light-diffusing layer 30 satisfies the following conditions:

1. having adequate light-diffusing characteristics which is high enough to prevent the specular characteristics of the specular reflective electrode when pixels carry out white displaying and with which the reflection rate of outside light is low enough (with back scattering of low degree) when pixels carry out black displaying.
2. having concaveness and convexness on its surface which are small enough compared with the thickness of liquid crystal layer 50 so that non-uniformity in the thickness of liquid crystal layer 50 is not caused.
3. having thickness small enough compared with the size of one of pixels, so that image diffusion, which causes reduction of image resolution, does not occur.

Therefore, the light-diffusing layer obtained by applying, to a substrate of glass or resin, a white coating material wherein a white pigment such as $TiO_2$, $ZnO$, $BaSO_4$ or nylon is dispersed in a binder such as acrylic resin, as shown in Japanese examined patent publication No. Sho 57-42867, tend to cause back scattering of high degree, and it is difficult for such a light-diffusing layer to satisfy the above described condition 1. Further, as powder dust tends to be caused by using a white coating material, there is another problem wherein the yield rate is reduced.

With a light-diffusing layer of crystalline polymer sheet as disclosed in Japanese examined patent publication No. Sho 57-43905, which is another example of the material of a light-diffusing layer, the thickness of the light-diffusing layer when it satisfies condition 1 is 0.1 to 10 mm, which is too high to satisfy condition 3. Particularly, when carrying out displaying of high resolution of at least 5 lines/mm, the reduction of image resolution is seen.

As described above, there is no conventional materials, for light-diffusing layers, which satisfy every necessary conditions, and more preferable materials has been desired.

SUMMARY OF THE INVENTION

It is an object of the present invention to provide a reflective liquid crystal display free of the defects found in the conventional art.

It is another object of the present invention to provide a reflective liquid crystal display whose displaying characteristics is improved by comprising a light-diffusing layer having adequate light-diffusing characteristics, having concaveness and convexness on its surface which are small enough compared with the thickness of a liquid crystal layer and having a thickness low enough compared with the size of one of pixels.

Additional objects and advantages of the invention will be set forth in part in the description which follows and in part will be apparent from the description, or may be learned by practice of the invention.

To solve the above described problems, the reflective liquid crystal display according to the present invention comprises:

a first substrate having a transparent electrode;

a second substrate having a specular, light-reflecting electrode provided so that its electrode surface faces the electrode surface of substrate 1;

a liquid crystal layer having dichroic dye and sandwiched by the first substrate and the second substrate; and a light-diffusing layer provided between the first substrate and the liquid crystal layer, and the light-diffusing layer comprises liquid crystalline polymer having directors of random orientation which varies spatially continuously.

In liquid crystalline polymer in liquid crystal phase, which has glass phase at the temperature lower than the one in liquid crystal phase, the orientation of directors can be frozen and fixed by phase transition from liquid crystal phase to glass phase. As a thin film obtained by freezing and curing the liquid crystalline polymer wherein directors are oriented randomly and varying spatially continuously in liquid crystal phase is opaque, this thin layer shows enough light-diffusing characteristics with back scattering of low degree in spite of its thinness of some μm, and further, its surface is very even. Therefore, with this liquid crystalline polymer, light-diffusing layers optimum for the above described conditions can be obtained.

Such good characteristics is due to the orientation of directors in liquid crystalline polymer and the degree of birefringence. Compared with high polymer compounds such as polyethylene and nylon, the birefringence of liquid crystalline polymer is 10 to 100 times as high as those of them, so it shows enough light-diffusing characteristics in spite of its thinness.

Further, in the liquid crystalline polymer layer, as directors showing general oriented directions of the polymer vary spatially continuously, the progressing direction of transmitted light conveyed through the layer is bent by the successive refraction of the light, and thus, light-diffusing characteristics can be obtained. This is also regarded to be the reason for low degree of back scattering.

On the other hand, with coating materials including white pigments, which are used for light-diffusing layers in the conventional example, as reflection is caused at interfaces between pigment and binder, the degree of back scattering tends to be high. In liquid crystal phase, the surface of the liquid crystalline polymer is made to be even by the surface tension, so the concaveness and convexness on the surface of a liquid crystal thin film obtained by freezing and curing the liquid crystal high polymer in liquid crystal phase as it is extremely small.

BRIEF DESCRIPTION OF THE DRAWINGS

The manner by which the above objects and the other objects, features and advantages of the preset invention are attained will be fully evident from the following detailed description when it is considered in light of the accompanying drawings, wherein.

DETAILED DESCRIPTION OF THE INVENTION

EMBODIMENT

An embodiment of the present invention is now described, referring to the FIGS. 1 to 5.

Figure 1:
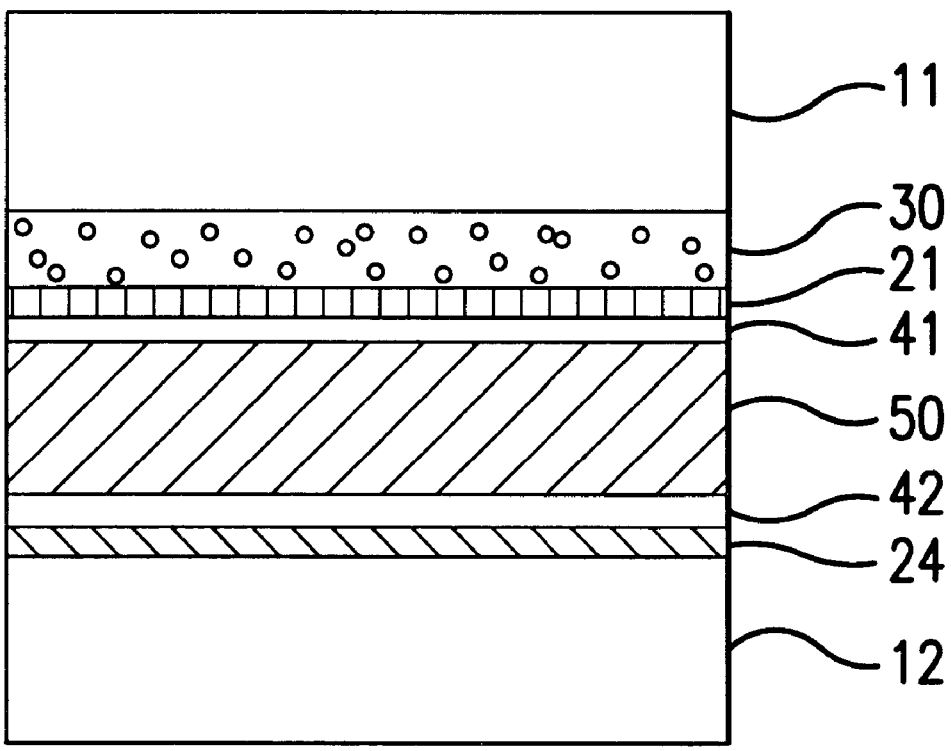
FIG. 1 is a cross-sectional view showing the structure of an embodiment of the reflective liquid crystal display according to the present invention.
Figure 2:
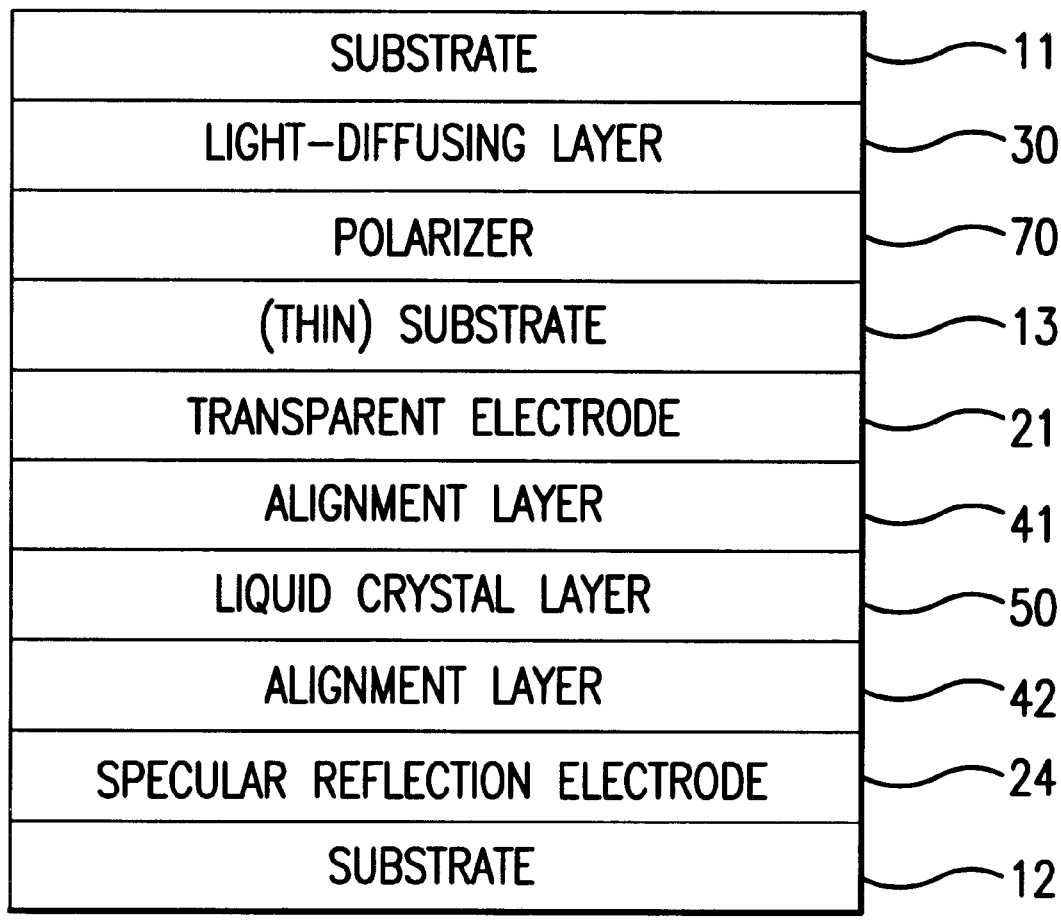
FIG. 2 is a cross-sectional view showing the structure of a conventional reflective liquid crystal display.
Figure 3:
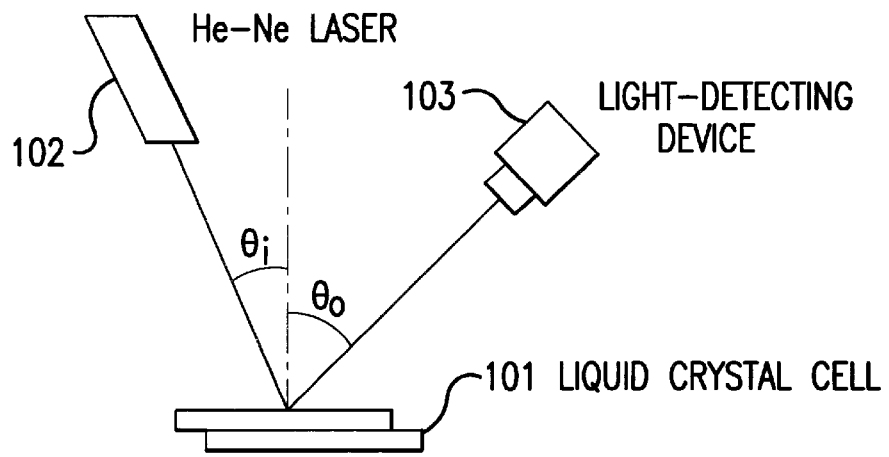
FIG. 3 shows an optical system with which the light-scattering characteristics of light-diffusing layer 30 and the voltage-reflection rate characteristics of the reflective liquid crystal display are measured.

FIG. 1 is a cross-sectional view showing a first embodiment of the reflective liquid crystal display according to the present invention. In it, the same portions as shown in FIG. 2 are identified by the same reference indications.

The reflective liquid crystal display according to the present invention comprises:

substrate 11 on which layers are laminated, in this order: light-diffusing layer 30; transparent electrode 21; and alignment layer 41; and substrate 12 on which layers are laminated, in this order: specular reflective electrode 24 having a specular surface; and alignment layer 42; and liquid crystal layer 50 sandwiched by these two substrates. The point particular to the present invention is that light-diffusing layer 30 comprises liquid crystal high polymer.

Substrates 11 and 12 comprise glass such as borosilicated glass or silica, or transparent resin such as polyacryl, polyethylene terephthalate or polycarbonate.

The producing method of the reflective liquid crystal display of the above described structure is now described.

Light-diffusing layer 30 comprising liquid crystal high polymer is formed on well cleaned substrate 11 as follows. As liquid crystalline polymer, a solution made by dissolving, in cyclohexanone, 20 percent by weight of polyacrylate poly-6CBA having cyanobiphenyl type mesogen and shown by the below described chemical formula is applied by spinning, the solvent of thus applied solution is dried, and a thin film is formed to a thickness of approximately 3 μm. This thin layer is then heated to be in isotropic phase on a hot stage, cooled quickly by being soaked in liquid nitrogen, and then a liquid crystalline polymer film wherein directors are oriented at random is formed.

poly-6CBA

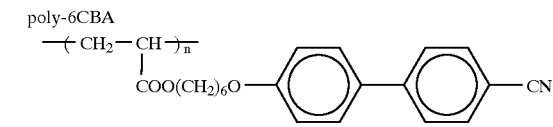

For liquid crystal high polymer, in addition to polyacrylate, principal chain type liquid crystalline polymer such as polyester, polyamide, polycarbonate or polyester imide, or side chain type liquid crystalline polymer such as polymethacrylate or polysiloxane can be used. Poly-6CBA is thermotropic liquid crystal showing liquid crystal characteristics at predetermined-ranged temperature. If orientation of directors is kept to some extent after a solvent is removed, lyotropic liquid crystal showing liquid crystal characteristics when it is in a state of solution can also be used. Liquid crystal phase shown by liquid crystalline polymer may be nematic or smectic.

To make the liquid crystalline polymer film look opaque, it is necessary that the orientation of orientation domains are at random. Here, an orientation domain is a space surrounded, in the state of a loop, by a disclination, which is a portion off the continuous spatial variation of directors. The size of an orientation domain is preferably in the range from 0.1 to 5.0 µm, with which sufficient light-diffusing characteristics can be obtained. Sizes of orientation domains can be controlled by the cooling speed, from isotropic phase to glass phase, of the liquid crystalline polymer film to make it a light-diffusing layer, chemical structure of the liquid crystalline polymer, surface treatment of substrate 11 or addition of foreign matters to the liquid crystalline polymer film.

The higher the degree of birefringence of the liquid crystalline polymer, the thinner light-diffusing layer 30 can be, and preferably, it is at least 0.1. The preferable range of the thickness of the liquid crystalline polymer film depends on the sizes of orientation domains or the degree of birefringence, and it can be selected in the range from 1 to 10 µm. It is possible to provide an orientation controlling layer between substrate 11 and light-diffusing layer 30 to control the light-diffusing characteristics.

When the surface roughness of light-diffusing layer 30 is measured by tracing type step meter, the distance between the lowest concaveness and the highest convexness is not more than 0.1 µm, which is small enough, compared with the thickness of liquid crystal layer 50 (1 to 10 µm), and small enough to prevent the non-uniformity of the thickness of liquid crystal layer 50.

Transparent electrode 21 is made by forming, on thus formed light-diffusing layer 30, a transparent conductive material such as $SnO_2$ or ITO (Indium Tin Oxide) by a deposition method or a sputtering method and then shaping the transparent film in accordance with a desired pattern by a photoetching method. To improve the contacting characteristics between light-diffusing layer 30 and transparent electrode 21, another layers can be provided between light-diffusing layer 30 and transparent electrode 21. It is possible to reverse the orders of light-diffusing layer 30 and transparent electrode 21, but in respect of reducing the driving voltage, the structure according to the present embodiment is more preferable. Alignment layer 41 is obtained by applying, on transparent electrode 21, a solution made by dissolving 5 percent by weight of polyvinyl butyral in 2-Ethoxyethanol by spinning, drying the solvent, and then applying rubbing treatment.

On substrate 12, a metal having high reflectance rate such as Al, Ag or Cr is formed by a deposition method or a sputtering method under a condition with which the metal surface becomes specular. Generally, the lower the temperature is, the higher the film forming speed is, the thinner the film is, the more easily the metal surface becomes specular. Specular reflective electrode 24 is then made by shaping the metal in accordance with a desired pattern. The thickness of specular reflective electrode 24 is selected in a range with which outside light is reflected completely and the resistance is low enough to use this layer as an electrode. The range is preferably from 1.0 to 2.0 µm. A solution made by dissolving 5 percent by weight of polyvinyl butyral in 2-Ethoxyethanol is applied to specular reflective electrode 24 by spinning, and after drying the solvent and applying rubbing treatment, alignment layer 42 is obtained.

An enclosure of adhesive having an aperture is made on one side of either substrate 11 or substrate 12, spheric resin spacers, each of which has a diameter of 10 µm are sprayed all over the side, and substrates 11 and 12 are glued together so that transparent electrode 21 faces specular reflective electrode 24. With spacers, a certain distance is kept between substrates 11 and 12, and a vacant cell, which is the state before liquid crystal is injected is made. Liquid crystal is injected into the vacant cell by placing the vacant cell under an atmosphere where the pressure is reduced with respect to atmospheric pressure, soaking the aperture of the enclosure in liquid crystal reservoir and then returning the pressure to the atmospheric pressure. After the liquid crystal injection, the aperture is sealed with another adhesive (end seal).

For liquid crystal layer 50, nematic liquid crystal comprising dichronic dye and chiral material is used. As dichronic dye, 1.4 percent by weight of black dichronic dye (S-344 available from Mitsui Toatsu Chemicals Inc.) mainly comprising azo type dye is added to phenylcychlohexane type nematic liquid crystal (ZLI-1840 available from E. Merck), which is the host. As chiral material, which is for making liquid crystal layer 50 spiral-structured, 2 percent by weight of an organic low polymer compound having an asymmetric carbon (ZLI-811 available from E. Merck) is added.

To examine the light-scattering characteristics of the above described light-diffusing layer 30, cell A made by injecting a dense black dye solution into the above described vacant cell and cell B made by injecting 2-Ethoxyethanol, which is transparent liquid having a refractive index rate approximately equal to that of liquid crystal, into the above described vacant cell, are prepared. The light-scattering characteristics of cell A is evaluated using an optical system shown in FIG. 3 wherein the cell is irradiated by He—Ne laser 102 from the direction forming an angle θi with respect to the normal line to the substrate and light-detecting device 103 is provided in the direction forming an angle θo with respect to the normal line to the substrate. The light-scattering characteristics of cell B is evaluated in the same manner. As a result of the evaluations wherein θi is 30° and θo is 0°, when the light-scattering intensity of cell A is 1, that of cell B is approximately 40, by which the degree of backscattering is regarded as small enough, compared with that of forward scattering. (The value detected by light-detecting device 103 for cell A is the backscattering intensity, and that for cell B is the backscattering intensity plus forward scattering intensity, so the value of forward scattering is obtained by subtracting the value for cell A from that for cell B.

Figure 4:
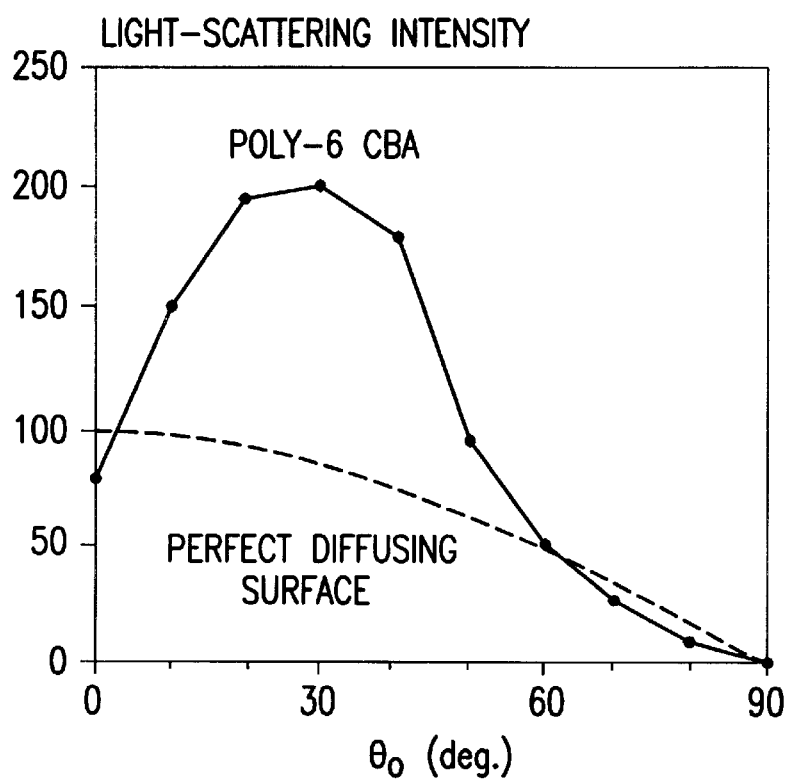
FIG. 4 is a chart showing the light-scattering characteristics of light-diffusing layer 30 of the embodiment.

FIG. 4 shows the relation between the light-scattering intensity of cell B and the angle θo formed between the normal line to the substrate and the direction wherein light-detecting device 103 is provided, under the same irradiating condition as described above. The relation between the light-scattering intensity of the perfect diffuse surface and the angle θo is also shown. When the angle θo is 30°, the light-scattering intensity of cell B is twice as high as that of the perfect diffuse surface, that is, the gain is 2.0, which shows that the reflectance rate of cell B is twice as bright as that of the perfect diffuse surface and the light-scattering characteristics of cell B is good. To prevent specular characteristics and to make a cell look bright, it is desirable that the gain is controlled to be in the range form 1.0 to 3.0.

Figure 5:
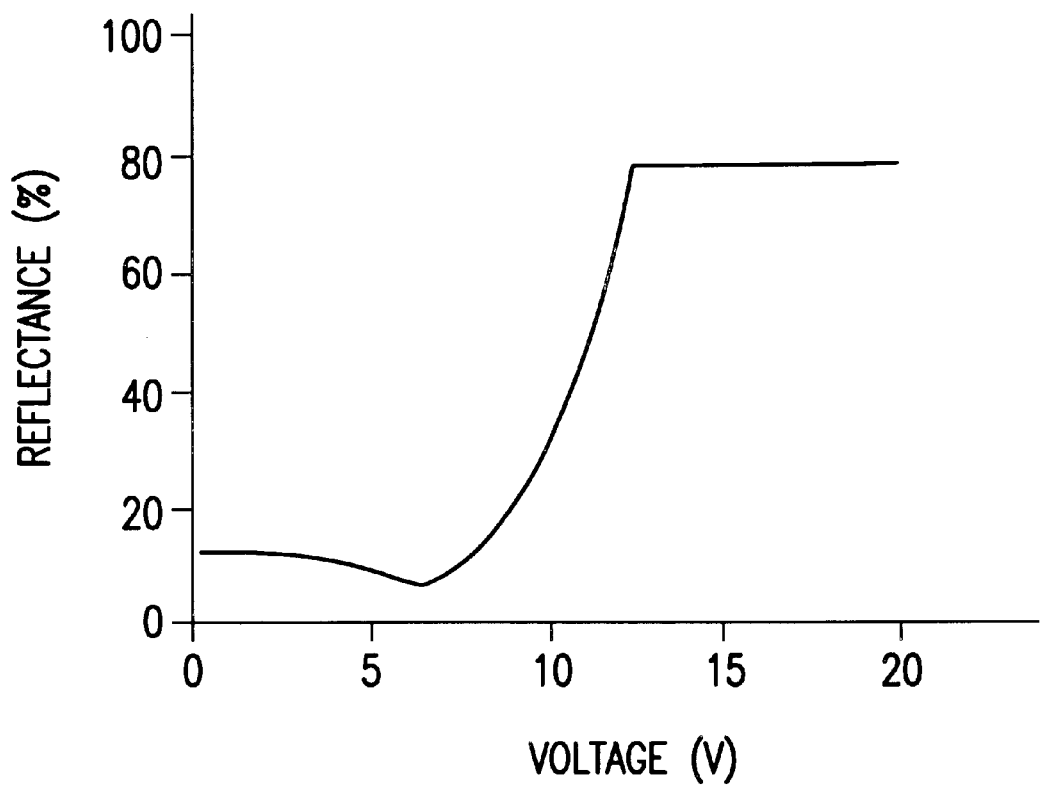
FIG. 5 is a chart showing the voltage-reflection rate characteristics of the reflective liquid crystal display of the embodiment.

FIG. 5 shows the relation between the driving voltage of the reflective liquid crystal display and the reflectance rate of the cell included in it, and here, the reflectance rate of the perfect diffuse surface is regarded to be 100 percent. FIG. 5 shows that, with the reflective liquid crystal display according to the present invention, a good contrast and a good reflectance rate can be obtained. Further, with the reflective liquid crystal display according to the present invention, even fine lines of 10 μm can be displayed without diffusion.

In the above described embodiment, a reflective liquid crystal display of PCGH method wherein a mixture of nematic liquid crystal, dichroic dye and chiral material is used for liquid crystal layer 50 is described. The same effects can be obtained by using, for liquid crystal layer 50, high polymer dispersed liquid crystal, which is a mixture of nematic liquid crystal and high polymer. In high polymer dispersed liquid crystal, high polymer phase and liquid crystal phase are separated like sea and islands provided in the sea, and liquid crystal layer 50 is made by adding dichroic dye to the liquid crystal phase.

Any high polymer dispersed liquid crystal can be used only if liquid crystal drops are dispersed in and held by a high polymer matrix. For example, liquid crystal drops can be individually separated, each of which is in microcapsulized state, or they can be connected. For high polymer dispersed liquid crystal, the one wherein a high polymer matrix comprising high polymers is cross-linked in gel state, or the one wherein fine apertures of a high polymer matrix are filled with liquid crystal drops can be used.

As producing methods of high polymer dispersed liquid crystal, the one wherein water-soluble polyvinyl alcohol is emulsionized as a high polymer component, the emulsion is spread on the substrate and then it is dried, the one wherein the material of a high polymer matrix and liquid crystal are mixed in advance, and phase separation is caused by thermally polymerizing them or polymerizing them by ultraviolet ray, and others are known. Any of these methods can be used. When dichroic dye is added to liquid crystal phase, it is to be added before emulsionizing or polymerizing.

With the present invention, as a light-diffusing layer comprises liquid crystalline polymer having directors oriented at random and varying spatially continuously, it is possible to make the thickness of the light-diffusing layer low enough, compared with the size of one of pixels, and to make the concaveness and convexness on the surface of the light-diffusing layer small enough, compared with the thickness of the liquid crystal layer. Therefore, adequate degree of light-diffusing characteristics which is high enough to prevent the specular characteristics of the specular reflective electrode when pixels carry out white displaying and with which the reflectance rate of outside light is low enough (with backscattering of low degree) when the pixels carry out black displaying is provided to the light-diffusing layer. With the present invention, in addition to a good white background and a high contrast, the thickness of the liquid crystal layer can be uniformed, and the reduction of image resolution, which is caused by diffusion can be prevented even in very fine panels.

Further, with liquid crystalline polymer, unlike a white coating material including a white pigment, powder dust is not caused, by which the deterioration of yield rate can be prevented.

As a result, reflective liquid crystal displays capable of displaying images of high contrast, high resolution, good visibility and having good white background can be produced with high production efficiency.

What is claimed is:

1. A reflective liquid crystal display, comprising:
   a first substrate having a transparent electrode;
   a second substrate having a specular, light-reflecting electrode provided so that its electrode surface faces an electrode surface of said first substrate;
   a liquid crystal layer having dichroic dye and sandwiched by said first substrate and said second substrate; and
   a light-diffusing layer provided between said first substrate and said liquid crystal layer,
   wherein said light-diffusing layer comprises liquid crystalline polymer having directors of random orientation which vary spatially continuously, and concavities and convexities are present on at least one surface of the light diffusing layer, the concavities and convexities not exceeding a specified percentage of a thickness of the liquid crystal layer.

2. The reflective liquid crystal display as recited in claim 1, wherein the light-diffusing layer has light-diffusing characteristics capable of preventing specular characteristics of the specular light-reflecting electrode when white displaying is carried out.

3. The reflective liquid crystal display as recited in claim 1, wherein the light-diffusing layer reflects outside light at a sufficiently low rate when black displaying is carried out.

4. The reflective liquid crystal display as recited in claim 1, wherein the specified percentage is 10%.

5. The reflective liquid crystal display as recited in claim 1, wherein the thickness of the light-diffusing layer is at least 0.1 μm.

6. The reflective liquid crystal display as recited in claim 1, wherein the thickness of the light-diffusing layer is between 1 and 10 μm.

7. The reflective liquid crystal display as recited in claim 1, wherein the liquid crystalline polymer comprises a solution made by dissolving, in cyclohexanone, 20% by weight of polyacrylate poly-6CBA having cyanobiphenyl type mesogen.

8. The reflective liquid crystal display of claim 1, wherein the liquid crystal phase shown by the liquid crystalline polymer is nematic.

9. The reflective liquid crystal display as recited in claim 1, wherein the liquid crystal phase shown by the liquid crystalline polymer is smectic.

10. The reflective liquid crystal display as recited in claim 1, wherein the light-diffusing layer comprising liquid crystalline polymer is arranged in orientation domains, the orientation of the orientation domains being random.

11. The reflective liquid crystal display as recited in claim 10, wherein the size of the orientation domains is in the range from 0.1 to 5.0 μm.

12. A reflective crystal display, comprising:
   a first substrate having a transparent electrode;
   a second substrate having a specular, light-reflecting electrode, the specular electrode facing the transparent electrode;
   a liquid crystal layer having dichroic dye and being positioned between the first substrate and the second substrate; and
   a light-diffusing layer provided between the first substrate and the liquid crystal layer;
   wherein the light-diffusing layer:
       has light-diffusing characteristics which are high enough to prevent specular characteristics of the specular reflective electrode when white displaying is carried out and at which a low degree of back scattering is present when black displaying is carried out;
       has concavities and convexities on the surface thereof, a height of the concavities and convexities not exceeding a specified percentage of a thickness of the liquid crystal layer;

has a thickness not exceeding a specified percentage of a width of a pixel of the reflective liquid crystal display so that reduction of image resolution does not occur; and comprises liquid crystalline polymer having directors of random orientation which vary spatially continuously.

13. The reflective liquid crystal display as recited in claim 12, wherein the specified percentage is 10%.

14. A reflective liquid crystal display, consisting essentially of:

a first substrate having a transparent electrode;

a second substrate having a specular, light-reflecting electrode provided so that its electrode surface faces an electrode surface of said first substrate;

a liquid crystal layer having dichroic dye and sandwiched by said first substrate and said second substrate; and a light-diffusing layer provided between said first substrate and said liquid crystal layer, wherein said light-diffusing layer comprises liquid crystalline polymer having directors of random orientation which vary spatially continuously.

* * * * *